(12) United States Patent
Van De Poel

(10) Patent No.: US 10,855,734 B2
(45) Date of Patent: Dec. 1, 2020

(54) REMOTE MANAGEMENT OF DEVICES

(75) Inventor: Dirk Van De Poel, Aartselaar (BE)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 839 days.

(21) Appl. No.: 14/129,469

(22) PCT Filed: Jun. 27, 2012

(86) PCT No.: PCT/EP2012/062415
§ 371 (c)(1),
(2), (4) Date: Dec. 26, 2013

(87) PCT Pub. No.: WO2013/000936
PCT Pub. Date: Jan. 3, 2013

(65) Prior Publication Data
US 2014/0129613 A1    May 8, 2014

(30) Foreign Application Priority Data

Jun. 29, 2011   (EP) .................................... 11447015

(51) Int. Cl.
*G06F 15/16*   (2006.01)
*H04L 29/06*   (2006.01)
*H04L 29/08*   (2006.01)

(52) U.S. Cl.
CPC ........ *H04L 65/4084* (2013.01); *H04L 65/103* (2013.01); *H04L 65/1053* (2013.01); *H04L 65/1069* (2013.01); *H04L 67/125* (2013.01)

(58) Field of Classification Search
CPC .............. H04L 65/103; H04L 65/1053; H04L 65/1069; H04L 65/4084; H04L 67/125;
(Continued)

(56) References Cited

U.S. PATENT DOCUMENTS 5,991,389 A * 11/1999 Ram ................... H04M 3/4228
  379/201.02
6,021,507 A *  2/2000 Chen ...................... H04L 29/06
  709/217
(Continued)

FOREIGN PATENT DOCUMENTS

CN        1852167      10/2006
CN      101064714      10/2007
(Continued)

OTHER PUBLICATIONS

Hillen etal: "Remote management of mobile devices with broadband forum's TR-069", 2008 13th international telecommunications network strategy and planning symposium. Networks 2008, Sep. 28-Oct. 2, 2008.
(Continued)

*Primary Examiner* — Khanh Q Dinh
(74) *Attorney, Agent, or Firm* — Volpe Koenig

(57) ABSTRACT

The invention relates to the field of remote management of devices, and devices for implementing the method. In particular the invention relates to a lifeline connection for remote manageable devices, which lifeline connection can be used to re-establish a communication that has been lost between a remote configuration management server and a remote manageable device.

12 Claims, 2 Drawing Sheets

Figure 1:
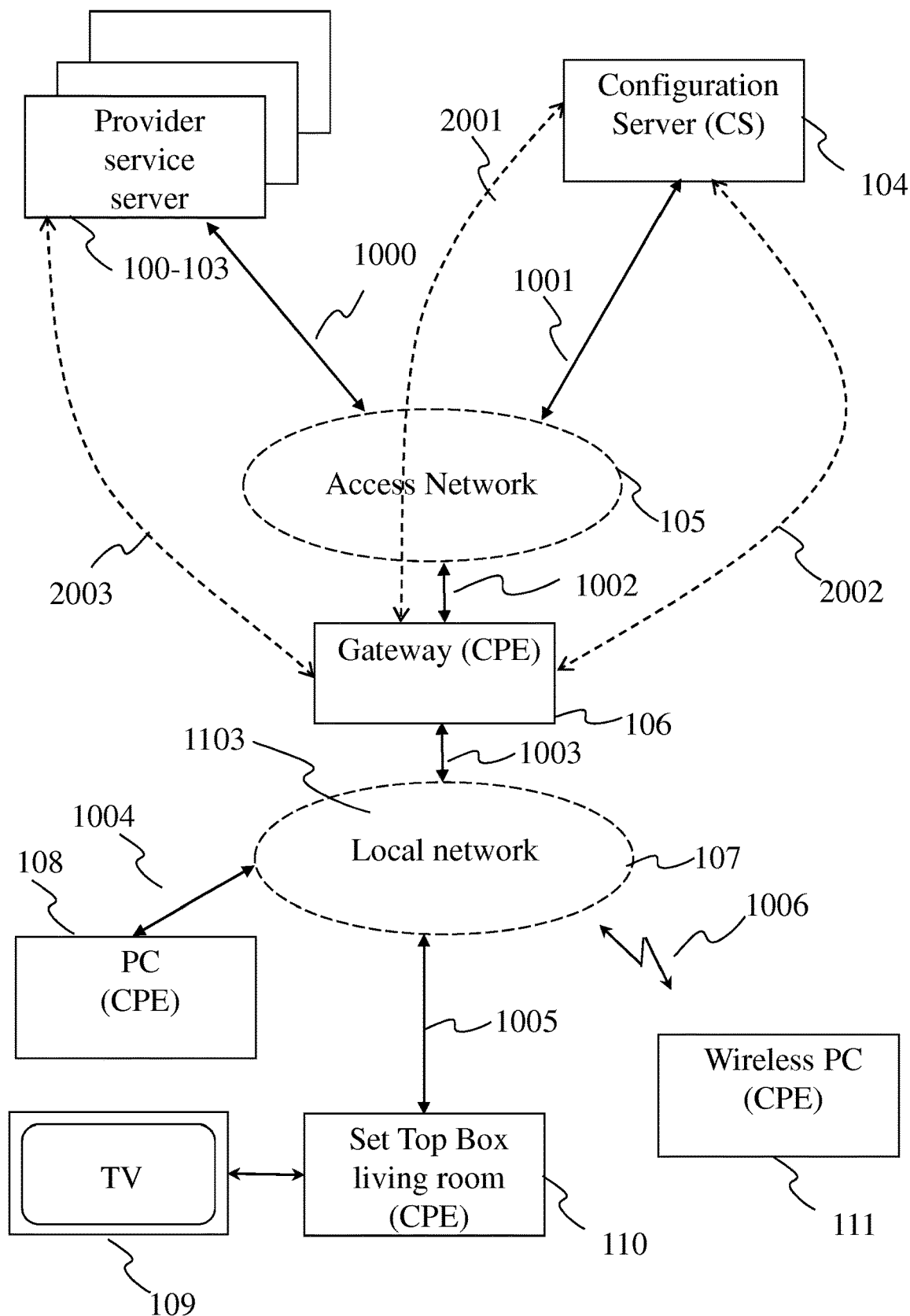

(58) Field of Classification Search
CPC ............ H04L 29/08072; H04L 29/06; H04W 63/164; H04W 4/60
USPC ................................ 709/227, 228, 232, 224
See application file for complete search history.

(56) References Cited

U.S. PATENT DOCUMENTS

| | | | |
|---|---|---|---|
| 6,671,729 B1* | 12/2003 | Gordon | H04L 63/0272 709/203 |
| 7,047,273 B2* | 5/2006 | Kamentsky | H04L 29/06 709/224 |
| 7,065,588 B2* | 6/2006 | Konda | G06F 17/30569 707/E17.006 |
| 7,130,899 B1* | 10/2006 | Bauer | G06F 11/2025 709/203 |
| 7,263,597 B2* | 8/2007 | Everdell | H04L 47/10 709/201 |
| 7,302,507 B2* | 11/2007 | Bandekar | H04L 67/14 709/203 |
| 7,502,726 B2* | 3/2009 | Panasyuk | G06F 21/31 703/22 |
| 7,739,541 B1* | 6/2010 | Rao | G06F 11/0709 709/205 |
| 7,739,727 B2 | 6/2010 | Syvanne | |
| 8,380,863 B2* | 2/2013 | Natarajan | H04L 12/4641 709/217 |
| 8,504,729 B2* | 8/2013 | Pezzutti | H04L 41/065 379/93.02 |
| 8,588,793 B2* | 11/2013 | Tomici | H04W 40/04 455/445 |
| 9,021,573 B2* | 4/2015 | Natarajan | H04L 12/4641 709/217 |
| 9,167,486 B2* | 10/2015 | Bachmann | H04L 63/164 |
| 2002/0116485 A1* | 8/2002 | Black | H04L 63/083 709/223 |
| 2002/0184349 A1* | 12/2002 | Manukyan | G06F 9/44505 709/221 |
| 2003/0137959 A1* | 7/2003 | Nebiker | H04L 12/58 370/338 |
| 2003/0182431 A1* | 9/2003 | Sturniolo | H04L 63/0272 709/227 |
| 2003/0221000 A1* | 11/2003 | Cherkasova | H04L 67/24 709/224 |
| 2003/0223466 A1* | 12/2003 | Noronha, Jr. | H04N 21/226 370/537 |
| 2003/0233450 A1* | 12/2003 | Carley | H04L 63/08 709/224 |
| 2003/0236905 A1* | 12/2003 | Choi | H04L 29/06 709/231 |
| 2004/0013253 A1* | 1/2004 | Hogan | H04M 3/4228 379/196 |
| 2005/0038526 A1 | 2/2005 | Choi | |
| 2005/0102503 A1* | 5/2005 | Imai | G06F 21/445 713/156 |
| 2005/0108320 A1* | 5/2005 | Lord | G06F 17/30038 709/201 |
| 2005/0149481 A1* | 7/2005 | Hesselink | H04L 63/0209 |
| 2005/0262379 A1* | 11/2005 | Visser | G06F 9/547 714/4.4 |
| 2006/0010245 A1* | 1/2006 | Carnahan | H04L 29/06027 709/231 |
| 2006/0031407 A1* | 2/2006 | Dispensa | H04L 29/12009 709/219 |
| 2006/0037072 A1* | 2/2006 | Rao | H04L 1/1854 726/14 |
| 2006/0248082 A1* | 11/2006 | Raikar | H04L 9/32 |
| 2006/0251226 A1* | 11/2006 | Hogan | H04M 3/51 379/114.15 |
| 2006/0277275 A1* | 12/2006 | Glaenzer | H04L 67/125 709/219 |
| 2007/0070987 A1* | 3/2007 | Shibasaki | H04W 76/027 370/352 |
| 2007/0165865 A1* | 7/2007 | Talvitie | H04L 63/0428 380/286 |
| 2007/0214262 A1* | 9/2007 | Buchbinder | H04L 12/24 709/224 |
| 2007/0226757 A1* | 9/2007 | Bashford | G06F 13/385 719/326 |
| 2007/0250632 A1* | 10/2007 | Nomura | H04L 63/08 709/227 |
| 2007/0256118 A1* | 11/2007 | Nomura | H04L 12/2803 726/3 |
| 2008/0056168 A1* | 3/2008 | Sinnarajah | H04L 29/06027 370/310 |
| 2009/0013210 A1* | 1/2009 | McIntosh | H04L 12/2697 714/4.1 |
| 2009/0024754 A1* | 1/2009 | Setton | H04L 65/4084 709/231 |
| 2009/0178128 A1* | 7/2009 | Chiba | H04L 67/14 726/7 |
| 2009/0182907 A1 | 7/2009 | Deck et al. | |
| 2010/0023806 A1* | 1/2010 | Justen | H04L 41/0213 714/15 |
| 2010/0054266 A1* | 3/2010 | Bouchat | H04L 12/2809 370/401 |
| 2010/0064183 A1* | 3/2010 | Buia | H04L 41/0604 714/57 |
| 2010/0306384 A1* | 12/2010 | Hayes | H04L 69/40 709/227 |
| 2011/0053571 A1* | 3/2011 | Mahdi et al. | H04W 36/12 455/414.1 |
| 2011/0060822 A1* | 3/2011 | Fan | H04L 41/04 709/224 |
| 2011/0066297 A1* | 3/2011 | Saberi | F16K 37/0091 700/287 |
| 2011/0238862 A1* | 9/2011 | Chaturvedi | H04L 63/0807 709/238 |
| 2012/0069787 A1* | 3/2012 | Tamura | H04L 12/2838 370/315 |
| 2012/0071168 A1* | 3/2012 | Tomici | H04W 40/04 455/445 |
| 2012/0158543 A1* | 6/2012 | Buch | G06Q 30/02 705/26.61 |
| 2012/0221955 A1* | 8/2012 | Raleigh | H04M 15/00 715/736 |
| 2012/0226673 A1* | 9/2012 | Li | G06F 11/0712 707/704 |
| 2012/0264443 A1* | 10/2012 | Ng | H04W 4/005 455/450 |
| 2012/0287228 A1* | 11/2012 | Mishra | H04M 3/567 348/14.09 |
| 2013/0060815 A1* | 3/2013 | Saeki | G06F 17/30575 707/802 |
| 2013/0133045 A1* | 5/2013 | Hayes | H04L 63/08 726/5 |
| 2013/0173751 A1* | 7/2013 | Zachos | H04L 69/08 709/219 |
| 2014/0036873 A1* | 2/2014 | Cheng | H04W 36/0022 370/331 |
| 2014/0129613 A1* | 5/2014 | Van Depoel | H04L 67/125 709/202 |
| 2014/0324952 A1* | 10/2014 | Irwin | H04L 65/1016 709/203 |
| 2015/0188895 A1* | 7/2015 | St-Germain | H04L 63/0471 713/153 |
| 2015/0264554 A1* | 9/2015 | Addepalli | H04W 4/046 370/328 |

FOREIGN PATENT DOCUMENTS

| | | |
|---|---|---|
| CN | 101765072 | 6/2010 |
| JP | 2003234743 | 8/2003 |
| JP | 2005065280 | 3/2005 |
| JP | 2006086897 | 3/2006 |
| JP | 2008227963 | 9/2008 |
| WO | WO03107133 | 12/2003 |

(56) References Cited

FOREIGN PATENT DOCUMENTS

| WO | WO2003107629 | 3/2004 |
|----|--------------|--------|
| WO | WO2007073761 | 7/2007 |

OTHER PUBLICATIONS

TR 069 CPE WAN Management Protocol, Broadband Forum, Issue 1, Amendment 4, Protocol Version 1.3, pp. 1-190; Jul. 2011.
"Enhancement of the Usage of Secondary Management Connection; C80216e-04_506", IEEE Draft; C80216e-04_506, IEEE-SA, Piscataway, NJ, USA, vol. 802.16e, Nov. 4, 2004, pp. 1-8, XP017624821, [Retrieved on Nov. 9, 2004], the whole document.
Search Report dated Aug. 8, 2012.

* cited by examiner

REMOTE MANAGEMENT OF DEVICES

This application claims the benefit, under 35 U.S.C. § 365 of International Application PCT/EP2012/062415, filed Jun. 27, 2012, which was published in accordance with PCT Article 21(2) on Jan. 3, 2013 in English and which claims the benefit of European patent application No. EP11447015.6, filed Jun. 29, 2011.

1. FIELD OF INVENTION

The invention relates to the field of remote management of devices, and devices for implementing the method. In particular the invention relates to a life-line connection for remote management of devices which can be used when a remote management communication has been lost between a remote manageable device and a remote management server.

2. TECHNICAL BACKGROUND

With the emergence of service subscriber devices in the home, for example so-called triple-play gateways (VoIP telephony (Voice over Internet Protocol), Internet, IP television), the problem arises for service operators of how to manage these service subscriber devices, so as to configure them correctly to be able to use/receive services proposed by these service operators in a satisfactory way. Notably, service operators may frequently need to install additional software, upgrade firmware, or configure existing soft- or hardware in a home gateway that is provided by the operator to provide new services, or to improve existing services.

Solutions comprise connecting these service subscriber devices to a dedicated configuration device or ACS (Auto Configuration Server), for example according to the TR-069 specification for remote configuration of CPE or service subscriber devices, the ACS being in charge of automatically distributing required software to the service subscriber devices. TR-069 is supported by devices such as gateways and routers, Set Top Boxes for audiovisual reception, voice over IP (VoIP) telephone sets, and Network Attached Storage (NAS).

However, existing solutions fail when communication between the ACS and the CPE devices is definitely lost, e.g. in case of TR-069, the CPE device is responsible for establishing a management session with the auto configuration server (ACS). The ACS can trigger at any time a CPE to establish a management session by a so-called "connection request". This relatively complex means for allowing remote management, that comprises additional security measures such as authentication, ensures the security of the remote management. Although TR-069 is designed to be a robust protocol, there are situations in which the ACS does not succeed in triggering the CPE to establish a remote management connection with it. Reasons of this failure comprise: TLS (Transport Layer Security) certificate expiration which results in the CPE no longer trusting the ACS and hence refuses to establish a management connection with the ACS; Configuration problem on the CPE, e.g. the CPE has lost the ACS URL (Uniform Resource Locator) or the CPE has wrong ACS authentication credentials; Network topology changes that were not communicated to the CPE device due to the CPE having been in a power-off state during a long time; or even voluntary end-user intervention e.g. by hacking, to disable the remote management for a reason of gaining control over the CPE device. This loss of the remote management connection poses a big problem for a service provider because the remote management connection is used for monitoring, diagnostics, configuration management, or even firmware update. A device which is no longer manageable, can no longer receive configuration updates required to use services such as QoS (Quality of Service), security or firewall services, IPTV (Internet Protocol TeleVision); new services such as adding of VoIP and configuration of the telephone number; diagnostics or troubleshooting for any reported issues such as bad connectivity, bad service quality); and automated firmware upgrade for resolving bugs or for introducing new device capabilities. Once the CPE has lost the correct location (address) of the ACS or has lost valid authentication information, the CPE is considered "lost" for the ACS because the CPE is unable to successfully establish a management connection to the server. In such a case, the communication between the service operator and the subscriber device is definitely lost and can only be restored by manual intervention of the operator, either by instructing the user or by sending of an engineer to the user's premises.

Document WO 03/107133 A2 "Secure Remote Management Appliance" (SMRA) of 23 Dec. 2003 describes loss of an existing connection to a network service and reestablishing a connection to the network service over another interface. But trying to contact the network managing station on another, additional network interface, would still not enable the SMRA to contact the network managing station in case of one of the previously described problems occurring (see above: 'Reasons of this failure comprise'), because a change of network interface does not remove these reasons of failure.

Document US 2011/060822 A1 "Apparatus and method for managing communications" of 10 Sep. 2009 describes a gateway managing a loss of a WAN connection by requesting a neighboring gateway to set up a management connection on its behalf. This would not enable the gateway to restore the WAN connection in case of one of the previously described problems occurring, because the failed gateway would not be able to set up the alternative management connection, e.g. in case of failure to provide appropriate credentials. In addition, this solution requires the failed gateway to be able to communicate with a neighboring gateway, which might be impossible when network topology has changed.

There is thus a need for optimization of the remote configuration management of an operator's service subscriber devices that are deployed in the homes of his customers, in order to support re-establishing of a remote management connection for devices that are considered as being 'lost' from a service provider point of view, and prevent the need for costly physical replacement of the device or per customer intervention.

3. SUMMARY OF THE INVENTION

The present invention aims at alleviating at least some of the inconveniences of prior art.

More precisely, the invention allows optimized remote management of a service operator's service subscription devices or CPE.

To this effect, the invention proposes a method of communication between a remote configuration device and a remote configurable device interconnected in a digital communication network via a remote management connection, the method comprising the steps, at the remote configuration device, of:

if it is determined that the remote management connection is lost,
  transmission, over a connection (2001) other than the remote management connection, to an address of the remote configurable device and to a predetermined port number of the remote configurable device, of a message comprising information and at least one command allowing reestablishment of the lost remote management connection by the remote configurable device;
  reception of a request for reestablishment of the remote management connection, the request being a result of use by the remote configurable device of the information comprised in the message and of application by the remote management device of the at least one command.

The invention also proposes a method of communication between a remote configurable device and a remote configuration device interconnected in a digital communication network via a remote management connection, the method comprises the steps, at the remote configurable device, of:
  if it is determined that the remote management connection is lost,
    reception, over a connection other than the remote management connection, on a predetermined port number, of a message that comprises information and at least one command allowing reestablishment, by the remote configurable device, of the remote management connection that is lost;
    applying of the at least one command;
    transmission of a request for reestablishment of the lost remote management connection to the remote configuration device, the request being a result of use of the information comprised in the message and of the applying of the at least one command.

According to a variant embodiment, the predetermined port number is that of a port number on which the remote configurable device listens for messages allowing the remote configurable device to reestablish the remote management connection with the remote configuration device when the remote management connection is lost.

According to a variant embodiment, the information comprises connection request credentials that are to be used for reestablishing the lost remote management connection.

According to a variant embodiment, the information comprises an address of the remote configuration device with which the lost remote management connection is to be reestablished.

The invention also comprises a device that comprises:
  a connection request server for reception, over a connection other than a remote management connection, on a predetermined port number of the device, of a message that comprises information and at least one command allowing reestablishment, by the device, of a remote management connection that is lost;
  a client module for transmission of a request for reestablishment of the lost remote management connection to a remote configuration device, the request being a result of use by the device of the information comprised in the message and of application by the device of the at least one command.

According to a variant embodiment of the device, the connection request server and the client module function independently of other modules of the device.

4. LIST OF FIGURES

Figure 2:
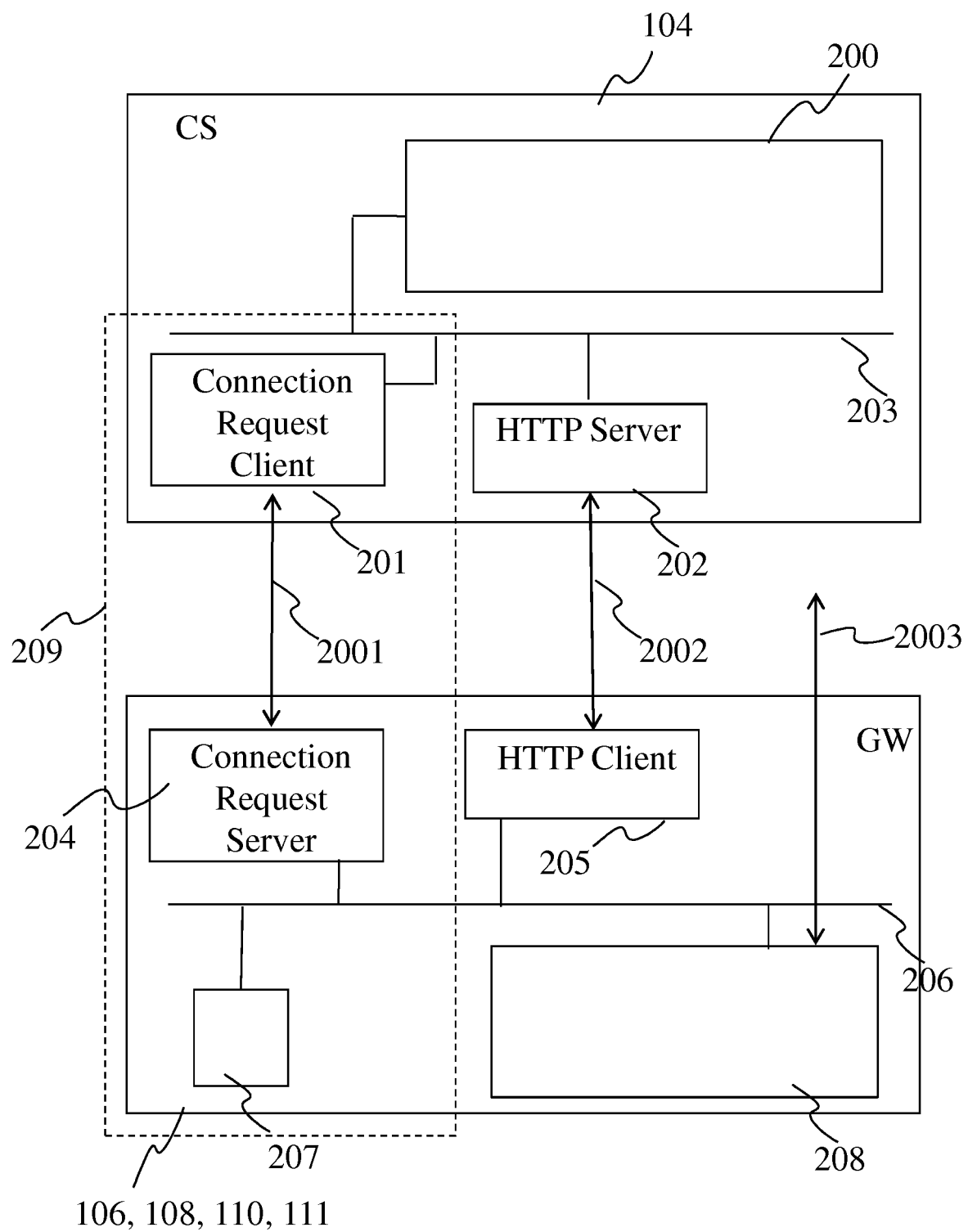

More advantages of the invention will appear through the description of particular, non-restricting embodiments of the invention. The embodiments will be described with reference to the following figures:

FIG. 1 shows an example network infrastructure in which the invention is implemented;

FIG. 2 shows additional modules 201 and 204 that are added to devices 104 and 106/108/110/111 of FIG. 1 that implement the invention.

5. DETAILED DESCRIPTION OF THE INVENTION

FIG. 1 shows an example network infrastructure in which the invention is implemented.

The network infrastructure comprises:
- a set of provider servers 100-103, for example a web server 100, a Video On Demand (VoD) server 101, a Broadband Broadcast Server 102 and a VoIP server 103;
- a configuration server (CS) 104;
- a gateway (GW) device 106, a CPE;
- an access network 105, for example the Internet, or a dedicated network; the access network interconnects provider servers 100-103 (via connection 1000), configuration server 104 (via connection 1001) and gateway 106 (via connection 1002);
- a local network 107, interconnecting devices on the home network, and connecting them via the gateway 106 to the access network 105 (via connections 1004, 1005 and 1006 and to the other devices (100-103, 104) connected to the access network 105;
- a personal computer (PC) 108, a CPE;
- a television set 109;
- a Set Top Box (STB) 110, a CPE; and
- a wireless PC 111, a CPE.

Gateway 106 is a device that is provided by the operator to offer triple-play services to the subscriber. The gateway 106 allows the subscriber to:
  access a VoD television and IP broadcast service provided by the operator's broadband broadcast server 101 respectively 102 over logical connection 2002 via IPTV Set Top Box 110 and TV set 109;
  access the Internet via PCs 108 and 111, service provided by web server 100 via logical connection 2003; and
  access an IP telephony service on a wireless DECT telephone set (DECT=Digital Enhanced Cordless Telecommunications), device not shown), service provided by VoIP server 103 via logical connection 2003.

Continuous lines 1000, 1001 and 1001 are physical connections. Broken lines 2001-2003 are logical connections. Broken line 2001 illustrates the logical lifeline connection according to the invention. Broken line 2002 illustrates the logical remote management connection between the configuration server 104 and the gateway CPE device 106. Broken line 2003 illustrates the logical connection between one or more service provider servers 100-103 and gateway 106. Though the broken lines are depicted as having a central point at gateway 106, it should be understood that these broken lines can connect any of the CPE devices 108, 110 and 111 as well to the provider service servers 100-103 and configuration server 104.

When the provider wants to send a configuration or software update to one or more of the CPE devices (106, 108, 110, 111), it instructs the configuration server 104 which automatically updates or reconfigures the selected CPE device(s), using remote management connection 2002, without manual intervention (i.e. without the operator's technical services being required to intervene at the subscriber's premises). In particular, the configuration server 104, using remote management connection 2002, can modify the address of the configuration server as it is stored in the gateway 106 (for example, if additional configuration servers are necessary due to an increased number of subscribers, or in case of redistribution of IP addresses; i.e. in case of a network topology change that impacts configuration server address(es)). However, when one or more subscriber's CPE devices are disconnected from the networks 105 or 107, or if they are powered down, the address update cannot be not propagated to these devices. Then, some of them may no longer be reachable for configuration management by the configuration server (i.e. the remote management connection 2002 is said to be 'lost'), which may result in incorrect behavior of the concerned CPE devices. According to another scenario, a software update distributed to CPEs during a configuration management session over remote management connection 2002 may result in a CPE operating system crash on reboot, in which case the concerned CPEs are definitely out of order and can no longer be reached by the configuration server for configuration management, and the subscriber can no longer access to the subscribed services, including for example a telephony service. According to yet another scenario, the one or more CPE devices in the subscriber's home network become unmanageable by the configuration server due to a wrong configuration sent out by the configuration server (remember, that the CPE device must establish the management connection; if data required to set up the management connection is wrong, the remote management connection 2002 cannot be set up by the CPE device). According to yet another scenario, the TLS (Transport Layer Security) security certificate has come to expire and the CPE device no longer trusts the configuration server, and the CPE device thus refuses to establish a management session. All of these scenarios and other not discussed scenarios make the CPE device unreachable for configuration management because they result in a loss of remote configuration connection 2002.

The invention therefore adds a lifeline connection 2001 allowing to restore a correct functioning of the CPE devices when a CPE device has become unmanageable for the ACS, i.e. when remote management connection 2002 is lost. In FIG. 2, the lifeline connection 2001 is connects the configuration server 104 to gateway 106. According to a variant embodiment, lifeline connection 2001 is connected to another device (not shown) than CS 104. This allows for example to 'troubleshoot' the gateway 106 from an ad-hoc device.

FIG. 2 shows additional modules 201, 204 and 207, that are added to devices 104 and 106 that implement the invention. These modules are indicated in FIG. 2 by dashed-line box 209. On the configuration server ("CS" or "ACS") side, a connection request client 201 is added to the configuration server 104. On the CPE side (106, 108, 110 or 111), a connection request server 203 and a persistent storage space 207 are added. The connection request client 201 in the CS 104 communicates with the connection request server in the CPE over a connection 2001. The service provider provides its services to any of the CPE devices via connection 2003.

During a configuration management session, HTTP client 205 in the CPE device (106, 108, 110 or 111) communicates with HTTP server 202 in the CS 104 via a remote management connection 2002. According to a particular embodiment, the HTTP server 202 and HTTP client 204 communicate over this connection 2002 according to the TR-069 protocol. Modules 200 and 208 are modules that are needed for the normal functioning of configuration server 104 respectively gateway 106. These modules comprise for example a CPU (Central Processing Unit), memory, a firewall, a NAT (Network Address Translation) module, and so on. The modules intercommunicate via internal communication means, such as an internal bus 203 for configuration server 104, respectively 206 for devices 106, 108, 110 or 111.

The connection 2001 constitutes a life-line connection to the devices 106, 108, 110 and 111 that allows to restore the remote management communication link 2003 when it is lost due to the non-exhaustive communication failure scenarios that were previously described for FIG. 1.

The role of the Connection Request Server (CRS) 204 of the devices 106, 108, 110 or 111 is to act as a server and listen for incoming connection requests, i.e. HTTP GET requests, on a predetermined port number, for example TCP port 7547. This port is hereafter referred to as 'lifeline connection port'. The CRS further authenticates entities that issue a request with a set of CPE configured credentials, for example factory default username and password. According to a variant embodiment of the invention, the CPE is provided with optional mechanisms such as those which allow to protect against malicious use. An example protection mechanism is connection request throttling allowing to limit the number of accepted requests over time, in order to protect the CPE against denial of service attacks, where the CPE would become unavailable when it is servicing many requests simultaneously.

The role of the HTTP client 205 of devices 106, 108, 110 or 111 is to act as an HTTP client that communicates over the remote configuration connection 2002 with the configuration server 104, possibly after having resolved the configuration server's URL (Unified Resource Locator) via DNS (Domain Name System) queries to one or more DNS servers (not shown) in order to obtain the IP address of the configuration server 104. A connection to the CS 104 is established on occurrence of a number of events, for example: whenever a connection request is received by the CRS 204 over the lifeline connection 2001 the CRS informs the HTTP client of such an event; on startup of the device 106, 108, 110 or 111, or when the device configuration of device 106, 108, 110 or 111 changes and the CS 104 subscribed to be notified of such a change. According to a variant embodiment, the list of events that trigger an establishment of a connection to the CS 104 comprises TR-069 Inform RPC (Remote Procedure Call) events. The HTTP client 205 of devices 106, 108, 110 or 111 further validates certificate signature provided by CS 104 with any one of a number of locally stored certificates (for example locally stored in persistent storage 107) to trust the CS 104, and the HTTP client 205 applies commands received from the CS 104, which commands comprise for example 'SetParameterValues' to modify a specific configuration parameter of the devices 106, 108, 110 or 111, stored in persistent storage 207, or 'Reboot'.

The role of the persistent storage 207 of devices 106, 108, 110 or 111 is to:
  comprise the CS URL (example: http://cs.provider.com);
  comprise connection request credentials (username and password);
  comprise one or more locally stored certificates that can be re-used to validate the CS provider certificate signature;

comprises the devices 106, 108, 110 or 111 manufacturer's public key, which is used to validate the authenticity of firmware images and other manufacturer provided data; and comprises the devices 106, 108, 110 or 111 CPE device configuration.

The Connection Request Client (CRC) 201 of the CS 104 is for example a HTTP client that can initiate a connection request and authenticate to the devices 106, 108, 110 or 111 at a particular point of time and trigger the establishment of a management session by the remote configurable device.

The role of the HTTP server 202 in CS 104 is among others to provide a HTTP server and to provide the CS's certificate signature to the devices 106, 108, 110 or 111.

In FIG. 2, the devices 106, 108, 110 or 111 are taken as example CPE devices. The invention is however not limited to implementation in these type of device, but can be implemented in any type of CPE.

When the remote configuration connection 2002 is lost, the CRS 204 of gateway 106 is configured to listen on the lifeline connection port. According to a particular embodiment, such a mechanism is implemented by a watchdog mechanism, where one of the other modules of the device implementing the invention regularly transmits a keep alive signal to the CRS 204. If the keep alive signal is not received after expiry of a watchdog timer, the listing process of the CRS is automatically started. According to another embodiment, the listening process is always active. The first embodiment allows for example to reduce the power consumption of the device implementing the invention as the listening process (and the modules required to implement the listening process) do not have to remain powered on all the time.

The CPE's IP address is typically known by the service operator. The lifeline connection port number is a default port number as fixed for example by IANA (Internet Assigned Numbers Authority) for TR-069 (TCP port 7547), or is agreed between the service provider and the CPE device manufacturer. When he CPE (for example GW 106) receives an incoming HTTP GET connection request message (i.e. a rescue message) on the lifeline connection port, the CPE's CRS (for example CRS 204 of GW 106) verifies the rescue message. In order to allow the CPE to reestablish the lost remote management connection with the remote configuration device, the rescue message comprises rescue information and a rescue command. Typical rescue information is: device entity, for example comprising Manufacturer ID, Product Class, Serial Number; this is to ensure that a the rescue command will only be taken into account by the CPE device for which it is destined; or a valid ACS URL, etc. Typical rescue commands comprise:

revert to factory defaults (to undo any user configuration or other configuration change that possibly led to the loss of remote management connection with the CS);

use a new CS URL provided in the rescue information;

set CS credentials (username, password) to the credentials provided in the rescue information;

disable CS certificate checking so as to trust the CS anyway; or open any other management interfaces such as a user interface, a Telnet session, so as to allow a service provider to connect and manage the device, e.g. for troubleshooting and correcting configuration problems. Optionally, to increase security and protect against malicious transmission of rescue messages commands over the lifeline connection 2001, the information in the rescue message comprises a hash value calculated over the rescue message command, signed with the CPE manufacturer's private key, so that the CPE device can check that the rescue command have not been altered by an unauthorized entity.

If the rescue message is correctly authenticated by the CPE, the CPE executes the rescue command, for example download of new firmware. After application of the rescue command, the CPE is correctly reconfigured and the CPE transmits a request for reestablishment of the remote management connection to the CS. This request is possibly based on the information provided in the rescue message (i.e. use of a provided new ACS URL or in other words address of the remote configuration device) and possibly comprises at least some of the information that was provided in the information provided in the rescue message (i.e. use of provided new connection request credentials that are valid for authentication); the request is thus a result of use by the remote configurable device of the information provided in the rescue message and of application by said remote management device of the rescue command comprised in the rescue message.

According to a variant embodiment, the CPE device confirms that the rescue command has been taken into account by sending a confirmation message over the lifeline connection 2001 to the CS indicating that the command has been taken into account. This variant has the advantage of signaling the exact moment to the configuration server when the CPE is ready to establish the remote management session.

According to a variant embodiment, a rescue message comprises several rescue commands that are to be executed by the CPE.

According to a variant embodiment, the CS transmits over the lifeline connection 2001, several rescue messages in order to apply several rescue commands. Optionally, each subsequent rescue message is transmitted only after having received the previously mentioned confirmation message that acknowledges the taking into account by the CPE of the previously transmitted rescue message.

According to yet another variant embodiment, the CPE, after having taken into account the rescue message(s), verifies if it is able to contact the CS and reports this back over the lifeline connection 2001.

According to a variant embodiment, the components that are necessary to implement the invention (connection request server 204 and client module 205) function in an autonomous manner, i.e. independently from other modules of the remote configurable device. In this case, even if the device that implements the invention has "crashed", i.e. gives no response, the device can be returned to an operable state via the lifeline connection 2001, that allows for example to download a good configuration or a corrected firmware version to the device that is in an inoperable and unmanageable state.

The variant embodiments can be combined to form a particular advantageous embodiment.

According to a particular embodiment, the invention is entirely implemented in hardware, for example as a dedicated component (for example as an ASIC, FPGA or VLSI) (respectively <<Application Specific Integrated Circuit>>, <<Field-Programmable Gate Array>> and <<Very Large Scale Integration>>) or as distinct electronic components integrated in a device or in a form of a mix of hardware and software.

The invention claimed is:

1. A method of communication between a configuration server device, CS, and a customer premises equipment device, CPE, said method comprising, at the configuration server device:
   if the configuration server device determined that a remote management connection with said customer premises equipment device is lost, because said configuration server device cannot trigger said customer premises equipment device to request said configuration server device to establish a remote management session with said customer premises equipment device:
   transmission, by said configuration server device, to the customer premises equipment device, of a rescue message and a rescue command, the rescue message comprising information enabling said customer premises equipment device to execute the rescue command, the rescue command enabling the customer premises equipment device to transmit, to the configuration server device, a request to establish said remote management session with said customer premises equipment device;
   reception, by said configuration server device and from the customer premises equipment device, of said request to establish said remote management session with said customer premises equipment device.

2. The method according to claim 1, wherein said rescue message is transmitted to a predetermined port number of said customer premises equipment device on which said customer premises equipment device listens for rescue messages.

3. The method according to claim 1, wherein the information comprises an address of the configuration server device.

4. The method according to claim 1, wherein the information comprises connection request credentials.

5. A method of communication between a customer premises equipment device, CPE, and a configuration server device, CS, wherein said method comprises, at the customer premises equipment device:
   if it is determined that a remote management connection with said customer premises equipment device is lost, because said customer premises equipment device is not triggered by said configuration server device to request said configuration server device to establish a remote management session with said customer premises equipment device:
   reception, by said customer premises equipment device from the configuration server device, of a rescue message and a rescue command, the rescue message comprising information enabling said customer premises equipment device to execute the rescue command, the rescue command enabling the customer premises equipment device to transmit, to the configuration server device, a request to establish said remote management session with said customer premises equipment device;
   transmission, by said customer premises equipment device to the configuration server device, of said request to establish said remote management session with said customer premises equipment device.

6. The method according to claim 5, wherein the rescue message is received on a predetermined port number on which said customer premises equipment device listens for rescue messages.

7. The method according to claim 5, wherein the information comprises an address of the configuration server device.

8. The method according to claim 5, wherein the information comprises connection request credentials.

9. The method according to claim 5, wherein the information comprises an address of the configuration server device.

10. The method according to claim 5, wherein the information comprises connection request credentials.

11. A customer premises equipment device, CPE, configured to be interconnected with a configuration server device, CS, wherein said customer premises equipment device comprises at least one processor, and a memory configured to:
    receive, if it is determined that a remote management connection with said customer premises equipment device is lost, because said customer premises equipment device is not triggered by said configuration server device to request said configuration server device to establish a remote management session with said customer premises equipment device, from the configuration server device, a rescue message and a rescue command, the rescue message comprising information enabling said customer premises equipment device to execute the rescue command, the rescue command enabling the customer premises equipment device to transmit, to the configuration server device, a request to establish said remote management session with said customer premises equipment device; and
    transmit, to the configuration server device, said request to establish said remote management session with said customer premises equipment device.

12. The device according to claim 11, wherein said at least one processor is further configured to listen for rescue messages received on a predetermined port number.

* * * * *